UNITED STATES PATENT OFFICE.

HAROLD S. ASHENHURST, OF CHICAGO, ILLINOIS.

HEAT-RESISTING CEMENT.

1,365,077. Specification of Letters Patent. Patented Jan. 11, 1921.

No Drawing. Application filed September 24, 1919. Serial No. 326,103.

*To all whom it may concern:*

Be it known that I, HAROLD S. ASHENHURST, a citizen of the United States and resident of Chicago, in the county of Cook and State of Illinois, have invented certain new and useful Improvements in Heat-Resisting Cements, of which the following is a specification.

My invention relates to cements and particularly to a fire resisting cementitious insulating substance adapted to be applied and adhere to hot surfaces.

It is well known that cements are required which will withstand the action of heat and it is desirable in connection with such cements that they adhere tightly to the surfaces with which they are in contact.

In preparing the cement which forms the subject-matter of this invention I utilize asbestos in the peculiar form covered in my Patent No. 1,317,853, dated October 7, 1919, as the principal constituent. This substance, as described in the application referred to, is prepared from the waste asbestos sand of the mills which produce this substance and consists of the double silicate of calcium and magnesium containing an appreciable quantity of soluble matter some of which is in the form of soluble silicates. The substance is relatively finely divided and of such physical characteristics that it has a weight of twenty-five to fifty pounds per cubic foot. On the addition of water to this substance the soluble matter is dissolved and evenly distributed throughout the mass. A mild reaction occurs which results in the formation of silica crystals which serve to bind the mass together thereby providing a cement having the capacity of resistance to extreme heat, which will not crack and which is very cheaply prepared.

However, notwithstanding the many desirable features of this cement, it will not adhere to hot surfaces; that is, surfaces having a temperature as high as 600 to 800 F., and it is highly desirable that a cement of this character should have such a characteristic. To that end I have by numerous experiments discovered that with the addition of a small quantity of a soluble neutral salt, such as the nitrates, sulfates and chlorides, I am able to produce a cement in which none of the valuable features heretofore referred to are lost and which has in addition the characteristic of adhesiveness to highly heated surfaces of iron and steel. I have employed the nitrates of sodium, potassium and ammonium, the sulfates of potassium, sodium and ammonium, and the chlorids of sodium, ammonium, calcium and strontium. The quantity of these substances added to the asbestos cement heretofore described should be approximately 4½ per cent. although from 5 to 10 per cent. may be used with good results. This is added in the dry state and the material is shipped in this form. On the addition of water the soluble salt goes into solution and permeates the entire mass. When the cement is applied to a hot iron surface the salt-bearing solution contacts the highly heated iron and a plurality of reactions, both primary and secondary, are believed to occur. At any rate, there is immediately formed as the result of the reaction an iron oxid, either the red or the black oxid, usually the latter. The oxid in the form of scale seems to combine mechanically with the short fibers of the cement and firmly fix the cement thereto. In other words, the salt either with or without the coöperation of the soluble substances contained in the cement acts as a flux for the iron and forms a tightly adhering scale within which the projecting fibers of the cement are embedded. This result may be secured by reason of hydrolytic action but as the exact theory is not known and as the theory is not essential in order to secure the desired result, I will not herein attempt to explain it. In practice the user will employ the chemical which may be most cheaply procured and the quantity employed will be substantially the same in all cases. While I have not made extensive experiments with other soluble, substantially neutral salts than those herein specified, I believe that any salt of this description which has the capacity of ready dissociation at low temperatures in the presence of water and iron will accomplish the desired result. As stated, however, that salt will be employed which may be most cheaply procured and in many instances sodium chlorid will be found to possess the required features of advantage.

It must not be assumed that asbestos in any form when combined with a soluble salt will produce the desired result. The cementitious action in the body of the material must be the same whether it is to be applied to hot or cold surfaces and it follows therefore that the material with which the soluble salt is combined must be a cement *per se* and must possess the ability to resist heat without change in form.

One of the particular advantages in the use of the composition here disclosed is that it may be formed and shipped in a dry state, requiring only the addition of water in order to produce the desired cement. This results in a material saving to the consumer, due to the reduction in the cost of shipping. Furthermore, the substance does not deteriorate or harden after the container has been opened and exposed to the air. A reduction of expense is also possible in the cost of cans or containers as it is not essential that the air be excluded from the material.

My invention comprehends the employment of any of the salts of the specified description within the limit of proportions named and I do not wish to be limited except as indicated in the appended claims.

I claim:

1. A new composition of matter composed of finely divided asbestos having weight of twenty-five to fifty pounds per cubic foot, a water-soluble salt, and water, combined as set forth.

2. A cementitious substance adapted to adhere to highly heated surfaces consisting of the finely ground double silicate of calcium and magnesium containing an appreciable quantity of water-soluble matter, and sodium chlorid, substantially as herein described.

3. A cementitious substance adapted to adhere to highly heated iron consisting of asbestos in such condition as to form a cement when combined with water, and sodium chlorid, substantially as described.

4. A cementitious substance adapted to adhere to highly heated surfaces consisting of the finely ground double silicate of calcium and magnesium containing an appreciable quantity of water-soluble matter, and a water-soluble salt, substantially as described.

5. A composition of matter composed of dry solids and consisting of the finely ground double silicate of calcium and magnesium as produced from the waste of asbestos mills, and a water-soluble salt, said composition when combined with water being adapted in and of itself to form a cement which will adhere to highly heated surfaces, substantially as described.

Signed at Chicago, Illinois, this 22nd day of Sept., 1919.

HAROLD S. ASHENHURST.

Witness:
T. D. BUTLER.